(12) United States Patent
Chuang et al.

(10) Patent No.: US 8,669,951 B2
(45) Date of Patent: Mar. 11, 2014

(54) OPTICAL TOUCH PANEL AND TOUCH DISPLAY PANEL AND TOUCH INPUT METHOD THEREOF

(75) Inventors: Hsing-Jung Chuang, Hsin-Chu (TW); Fu-Cheng Fan, Hsin-Chu (TW); Jia-Wei Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 372 days.

(21) Appl. No.: 13/031,601

(22) Filed: Feb. 21, 2011

(65) Prior Publication Data

US 2011/0298753 A1 Dec. 8, 2011

(30) Foreign Application Priority Data

Jun. 4, 2010 (TW) ................................ 99118130 A (51) Int. Cl.
*G06F 3/042* (2006.01)
(52) U.S. Cl.
USPC ........... 345/173; 345/174; 345/175; 345/176; 345/177; 178/18.09
(58) Field of Classification Search
USPC .................................. 345/173, 175; 178/18.09
See application file for complete search history.

(56) References Cited

U.S. PATENT DOCUMENTS

| 7,629,961 B2 * | 12/2009 | Casebolt et al. | 345/166 |
| 2003/0160155 A1 | 8/2003 | Liess | |
| 2003/0234346 A1 | 12/2003 | Kao | |
| 2008/0278460 A1 * | 11/2008 | Arnett et al. | 345/175 |
| 2010/0103139 A1 * | 4/2010 | Soo et al. | 345/175 |
| 2011/0298753 A1 * | 12/2011 | Chuang et al. | 345/175 |

FOREIGN PATENT DOCUMENTS

| CN | 101441540 A | 5/2009 |
| TW | 589567 | 6/2004 |

* cited by examiner

*Primary Examiner* — Alexander S Beck
*Assistant Examiner* — Jeffrey Steinberg
(74) *Attorney, Agent, or Firm* — Winston Hsu; Scott Margo (57) ABSTRACT

An optical touch panel includes a substrate, a single planar light generator, at least a retro reflector device, and a single photo sensor array. The substrate has a surface. The single planar light generator is disposed outside the surface of the substrate for generating a planar light, where the illuminating range of the planar light covers the range of the surface of the substrate. The retro reflector device is disposed on a side of the substrate for reflecting the planar light. The single photo sensor array is disposed outside the surface of the substrate for sensing the reflected planar light and generating reflected light distribution information.

12 Claims, 7 Drawing Sheets

OPTICAL TOUCH PANEL AND TOUCH DISPLAY PANEL AND TOUCH INPUT METHOD THEREOF

BACKGROUND OF THE INVENTION

1. Field of the Invention

The present invention relates to a touch display device having an optical touch panel and a touch input method thereof, and more particularly, to an optical touch panel which comprises only a single planar light generator and a single photo sensor array, and to the touch display device which includes the optical touch panel mentioned above and a touch input method thereof.

2. Description of the Prior Art

In all kinds of consumer electronic products of nowadays, the mobile electronic products, such as tablet computer, personal digital assistance (PDA), mobile phone and global position system (GPS), have widely adopted touch panel as human machine interface to reduce the volume of the electronic products.

Generally, according to the difference of the touch input mechanisms, touch panels can be classified into resistive touch panel, capacitive touch panel, and optical touch panel. Among all these types of touch panels, because of the advantages of long lifetime, high light transmittance, and so on, the optical touch panels have been widely applied to various kinds of electronic products.

Figure 1:
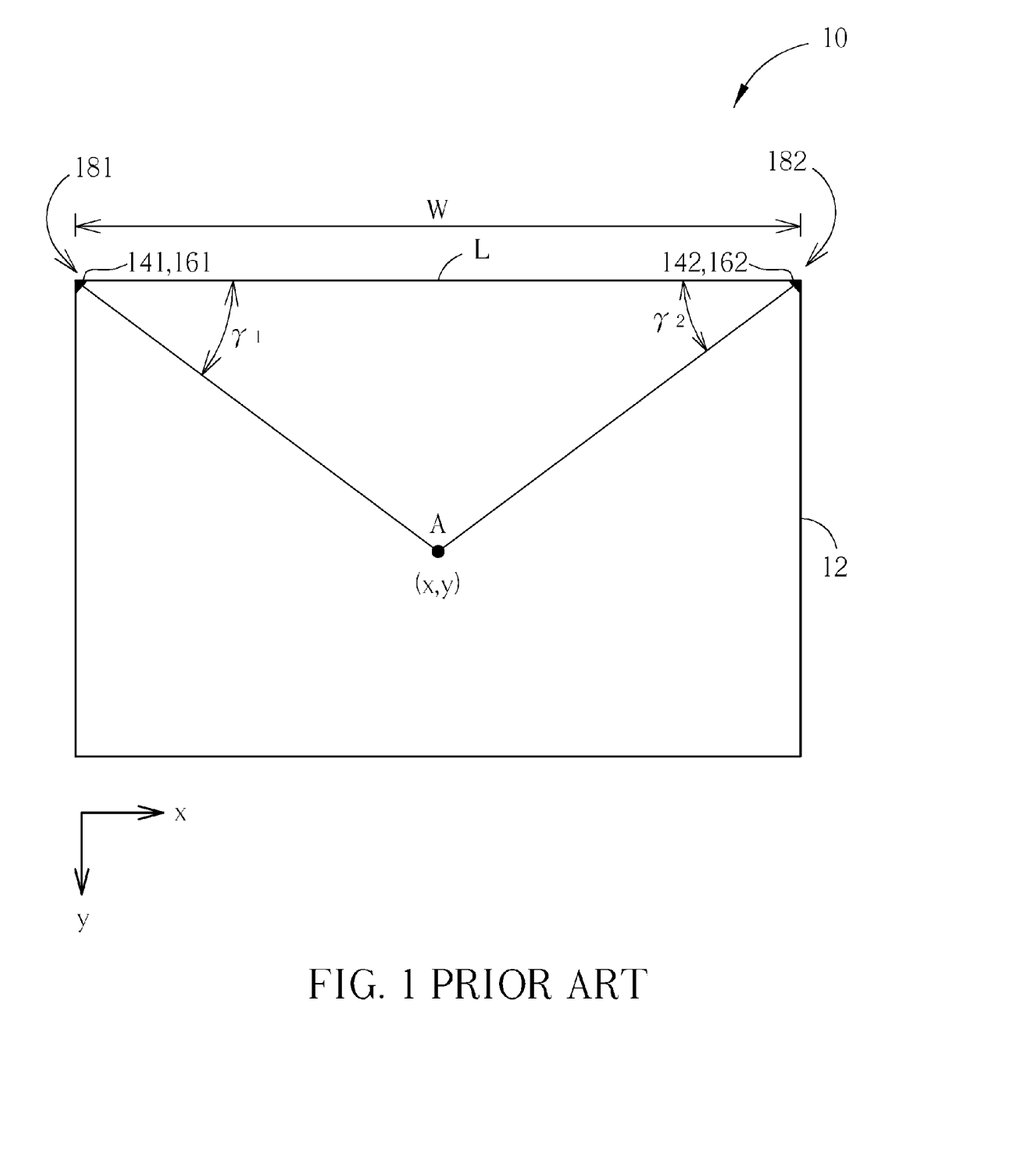
FIG. 1 illustrates a schematic diagram of a conventional optical touch panel.

FIG. 1 illustrates a schematic diagram of a conventional optical touch panel. As shown in FIG. 1, the conventional optical touch panel 10 includes a substrate 12, a first light generator 141 disposed in a first corner 181 of the substrate 12, a second light generator 142 disposed in a second corner 182 of the substrate 12, a first light receiver 161 disposed in the first corner 181 of the substrate 12, and a second light receiver 162 disposed in a second corner 182. When inputting at an input point A by a touch input device, such as a touch pen (which is not shown in FIG. 1), a light emitted by the first light generator 141 is reflected by the touch input device and received by the first light receiver 161 so that a first included angle γ1 between a connected line of the first corner 181 and the input point A and a side L of the substrate 12 is obtained. Also, a light emitted by the second light generator 142 is reflected by the touch input device and received by the second light receiver 162 so that a second included angle γ2 between a connected line of the second corner 182 and the touch input point A and the side L of the substrate 12 is obtained. Therefore, as a length W of the side L of the substrate 12 is known, a horizontal coordinate x and a vertical coordinate y of the input point A can be calculated by the following equations (A) and (B).

$$x = \frac{W \tan\gamma 2}{\tan\gamma 1 + \tan\gamma 2} \qquad \text{equation (A)}$$

$$y = x \tan\gamma 1 \qquad \text{equation (B)}$$

Accordingly, the conventional optical touch panel must have at least two light generators and at least two light receivers to calculate the correct input position. However, the increase in light generators and light receivers represents the increase in the cost of the product and the complication of the process.

SUMMARY OF THE INVENTION

It is therefore one of the objectives of the present invention to provide a touch display device with an optical touch panel and a touch input method thereof to decrease the cost of the product and the complication of the process.

In accordance with an embodiment of the present invention, an optical touch panel includes a substrate, a single planar light generator, a retro reflector device, and a single photo sensor array. The substrate has a surface. The single light generator is disposed outside the surface of the substrate for generating a planar light whose illuminating range covers the entire surface of the substrate. The retro reflector device is disposed on at least a side of the substrate for reflecting the planar light. The single photo sensor array is disposed outside the surface of the substrate for sensing the reflected planar light and producing distribution information of the reflected light.

In accordance with another embodiment of the present invention, a touch display device including a display panel and an optical touch panel mentioned above is provided.

In accordance with further embodiment of the present invention, a touch input method includes the following steps. First of all, provide an optical touch panel mentioned above. Next, implement touch input on the surface of the substrate with the touch input device. While the touch input is implementing, a part of the planar light is hindered from reflecting to the single photo sensing array by the touch input device. At last, use a signal processing unit to process a calculating procedure of the touch input for calculating the coordinates of the touch input position based on the reflected light distribution information produced by the single photo sensor array.

The optical touch panel and the touch input method thereof of the present invention only dispose a single planar light generator and a single photo sensor array to carry out the touch input function, which can substantially decrease the cost of the product and the complication of the process.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 2:
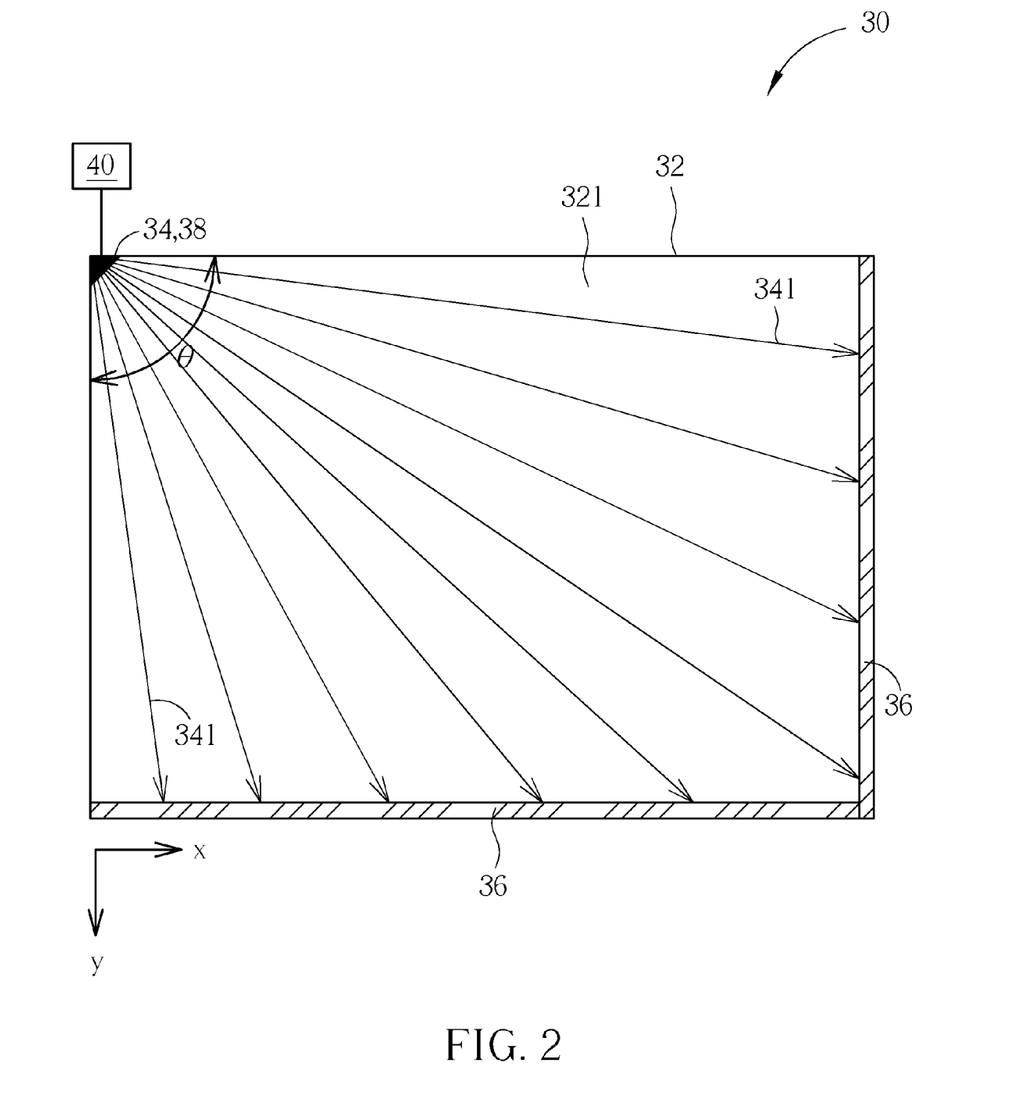
FIG. 2 illustrates an optical touch panel of a preferred embodiment of the present invention when no touch input is implemented.

FIG. 2 illustrates an optical touch panel of a preferred embodiment of the present invention when no touch input is implemented. As shown in FIG. 2, the optical touch panel 30 of the embodiment includes a substrate 32, a single planar light generator 34, at least a retro reflector device 36, a single photo sensor array 38 and a signal processing unit 40. The substrate 32 has a surface 321. The single planar light generator 34 is disposed outside the surface 321 of the substrate 32 for generating a planar light 341 which covers the entire range of the surface 321 of the substrate 32. Moreover, the planar light 341 may be the light which is emitted by the single planar light generator 34 at the same time or the light which is constructed by scanning from a linear light emitted by the planar light generator 34 in a short period of time. The single planar light generator 34 includes an infrared light generator (such as infrared light emitting diode), a laser light generator (such as laser light emitting diode), or any other type of light generator which is able to generate a visible light or an invisible light with a specific wavelength. In this embodiment, the planar light generator 34 is disposed in a corner of the substrate 32. The illuminating range of the planar light 341 is defined by an azimuth angle θ, and the counterclockwise is defined as a positive direction so that the illuminating range of the planar light generator 34 is substantially in a range where the azimuth angle θ is between 0 degree and 90 degrees. The position of the single planar light generator 34 is not limited to the corner of the substrate 32, and for instance may be on the edge of the substrate 32 or in any other appropriate place outside the surface 321. Also, the single planar light generator 34 may be placed at the same horizontal level with the surface 321 of the substrate 32, or at different horizontal level from the surface 321 of the substrate 32. Moreover, the position of the single photo sensor array 38 is disposed outside of the surface 321 of the substrate 32, preferably disposed in the same position as the single planar light generator 34, but not limited thereto. In this embodiment, the single photo sensor array 38 may be disposed in the same corner as the single planar light generator 34, and vertically stacked on the single planar light generator 34 or horizontally aligned with the single planar light generator 34, but not limited thereto. The single photo sensor array 38 can detect the planar light 341 emitted by the planar light generator 34. The single photo sensor array 38 may be a photo sensor array or an image capture array constructed by any kind of the photo sensor device, such as a complementary metal-oxide-semiconductor (CMOS) photo sensor array or a charge-coupled device (CCD) photo sensor array, but not limited thereto. The retro reflector device 36 is disposed on at least an edge of the substrate 32 for reflecting the planar light 341. In this embodiment, the retro reflector devices 36 are disposed on two edges of the substrate 32. The property of the retro reflector device 36 is that the planar light 341 reaching any position of the retro reflector device 36 is reflected to the single photo sensor array 38. In this embodiment, the retro reflector device 36 is disposed on the other side of the substrate 32 opposite to the side where the single planar light generator 34 is placed. Accordingly, the planar light 341 emitted by the single planar light generator 34 is reflected to the single photo sensor array 38. The position of the retro reflector device 36 is not limited. The number and the position of the retro reflector device 36 can be appropriately adjusted based on the location of the planar light generator 34. Moreover, the planar light 341 reflected by the retro reflector device 36 is detected by the single photo sensor array 38, thereby producing reflected light distribution information. Accordingly, the signal processing unit calculates a set of coordinates of a touch input position based on the reflected light distribution information produced by the single photo sensor array 38.

Figure 3:
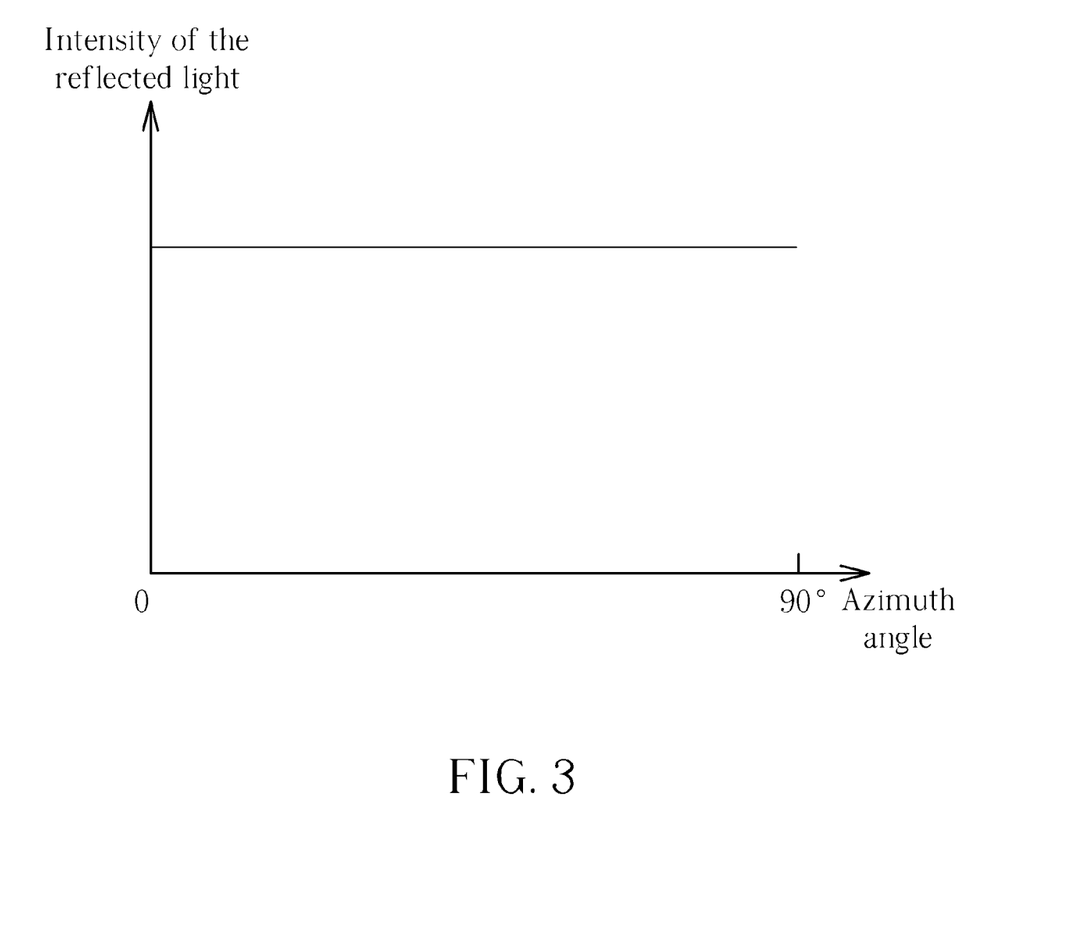
FIG. 3 is the reflected light distribution information recorded when no touch input is implemented.

Please refer to FIG. 3 and FIG. 2 as well. FIG. 3 is the reflected light distribution information recorded when no touch input is implemented. As shown in FIG. 2, all the planar light 341 is reflected to the single photo sensor array 38 as touch input is not implementing. Therefore, the intensity of the reflected light is substantially uniform in the corresponding range of the surface 321 of the substrate 32 where the azimuth angle θ is in the range from 0 degree to 90 degrees. Because of the uniform intensity of the reflected light having the azimuth angle θ ranging from 0 degree to 90 degrees when the touch input is not implementing, the signal processing unit determines that there is no touch input. It is appreciated that according to the different shape and size of the substrate 32 or to the different relative positions of the single planar light generator 34, the retro reflector device 36, and the single photo sensor array 38, the reflected light may not have the same intensity within the azimuth angle θ ranging from 0 degree to 90 degrees; however, the intensity of the reflected light still have the specific distribution information.

Figure 4:
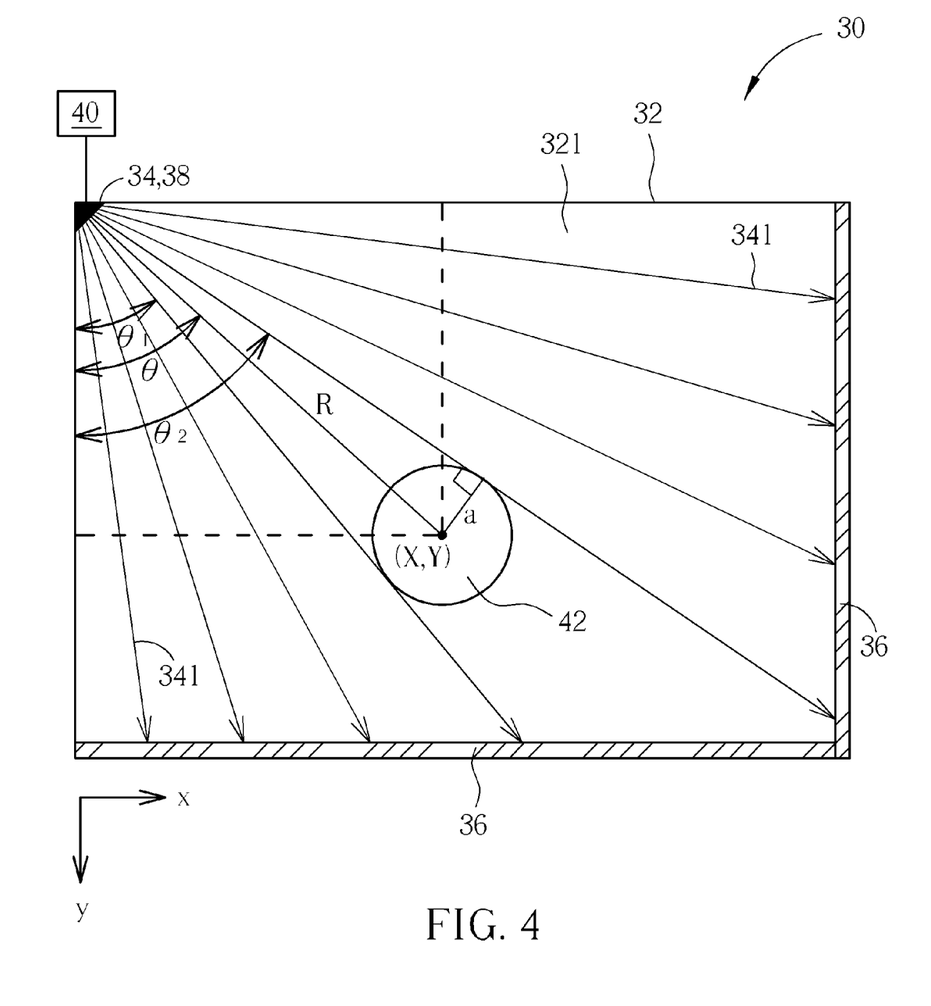
FIG. 4 illustrates the optical touch panel of the preferred embodiment when touch input is implemented.
Figure 5:
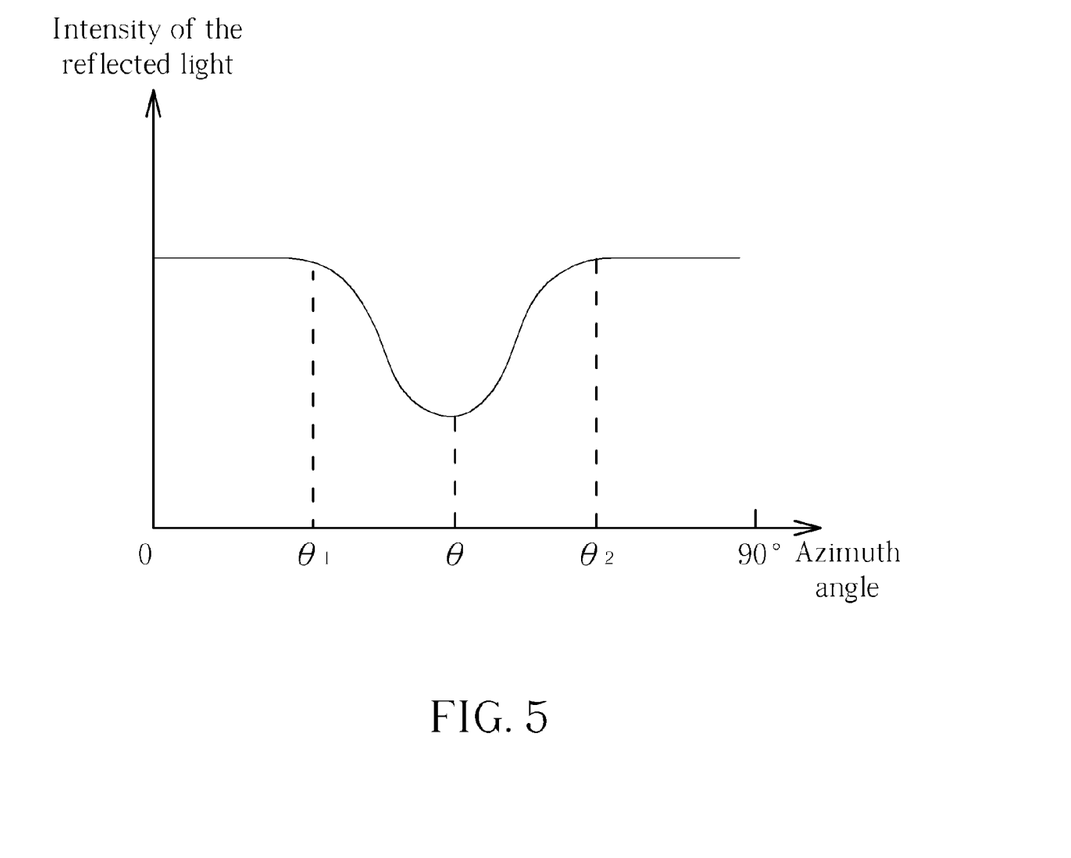
FIG. 5 is the reflected light distribution information recorded when touch input is implemented.

Please further refer to FIG. 4 and FIG. 5. FIG. 4 illustrates the optical touch panel of the preferred embodiment when touch input is implemented, and FIG. 5 is the reflected light distribution information recorded when touch input is implemented. As shown in FIG. 4, the user can implement touch input on the surface 321 of the substrate 32 with a touch input device 42 of the optical touch panel 30, such as a touch stylus. The touch input device 42 has a known radius a in this embodiment. When touch input is implementing, a part of the planar light 341 is blocked, absorbed, or scattered by the touch input device 42 from reflecting to the single photo sensor array 38. Under this condition, the single photo sensor array 38 will generate reflected light distribution information which is different from the reflected light distribution information when no touch input is implemented, as shown in FIG. 5. The signal processing unit 40 can therefore implement the touch input calculation procedure to calculate the position of the touch input. The touch input calculation procedure includes the following steps. The signal processing unit 40 determines a central azimuth angle θ, a first boundary azimuth angle θ1, and a second boundary azimuth angle θ2 based on the reflected light distribution information under the condition that the touch input is implementing. The central azimuth angle θ is the angle with the least intensity of the reflected light throughout the reflected light distribution information and represents the central point of the touch input device 42. The first boundary azimuth angle θ1 and the second boundary azimuth angle θ2 correspond respectively to the angles of two initial points where the intensity of the reflected light begin to decrease and respectively represent two outside end points of the perimeter of the touch input device 42. Then, calculate a distance R between the single photo sensor array 38 and the touch input position by the following equation 1. Subsequently, calculate a horizontal coordinate X of the touch input position by the following equation 2 and a vertical coordinate Y of the touch input position by the following equation 3.

$$R = \frac{a}{\sin\left(\frac{\theta 2 - \theta 1}{2}\right)} \quad \text{equation 1}$$

$$X = R\sin\theta \quad \text{equation 2}$$

$$Y = R\cos\theta \quad \text{equation 3}$$

Figure 6:
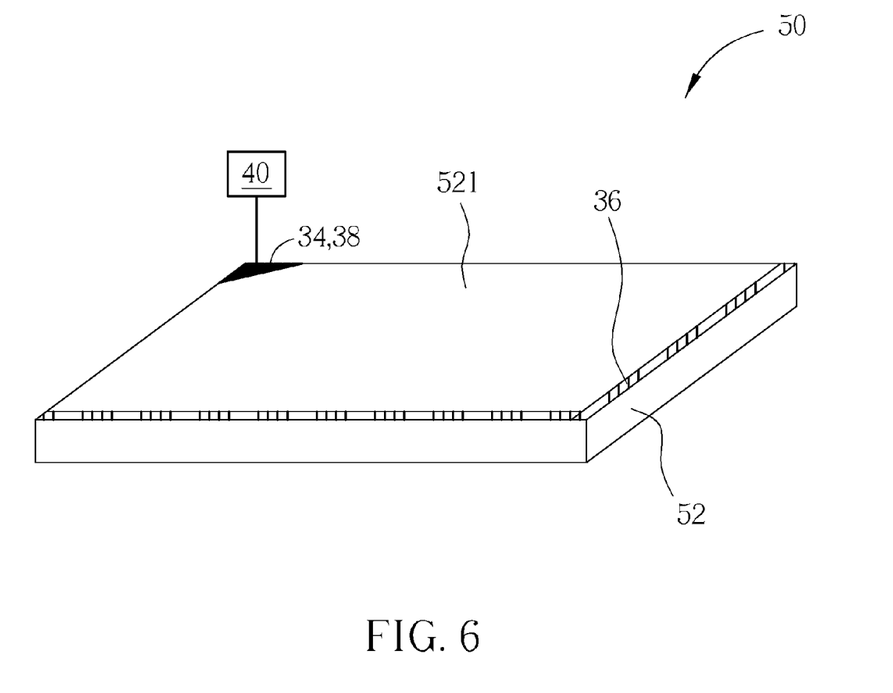
FIG. 6 illustrates a touch display device of another preferred embodiment of the present invention.

In the aforementioned embodiment, the optical touch panel 30 can be a panel with only the function of touch input, but the application in the present invention is not limited thereto. For example, the optical touch panel can integrate with a display panel to be a touch display device. The optical touch panel can also applied to tablet computer, personal digital assistance, mobile phone, global position system, digital camera, flat panel display, and any other electronic products. Please refer to FIG. 6 and FIG. 2 as well. FIG. 6 illustrates a touch display device of another preferred embodiment of the present invention. As shown in FIG. 6, a touch display device 50 of this embodiment includes a display panel 52 and an optical touch panel 30. The display panel 52 can be all kinds of display panel, such as a liquid crystal display panel, an organic light-emitting diode display panel, a plasma display panel, a cathode ray tube display panel, a field emission display, and so on. The devices and the properties of the optical touch panel are mentioned above and are not redundantly described. It is noted that in this embodiment, the substrate of the optical touch panel can be the substrate of the display panel 52 and the surface of the substrate is the display surface 521 of the display panel 52. In other words, in this condition, the manufacturing process of the optical touch panel 30 can be integrated with the manufacturing process of the display panel 52 to save one piece of substrate and to further improve the light transmittance of the touch display device 50.

Figure 7:
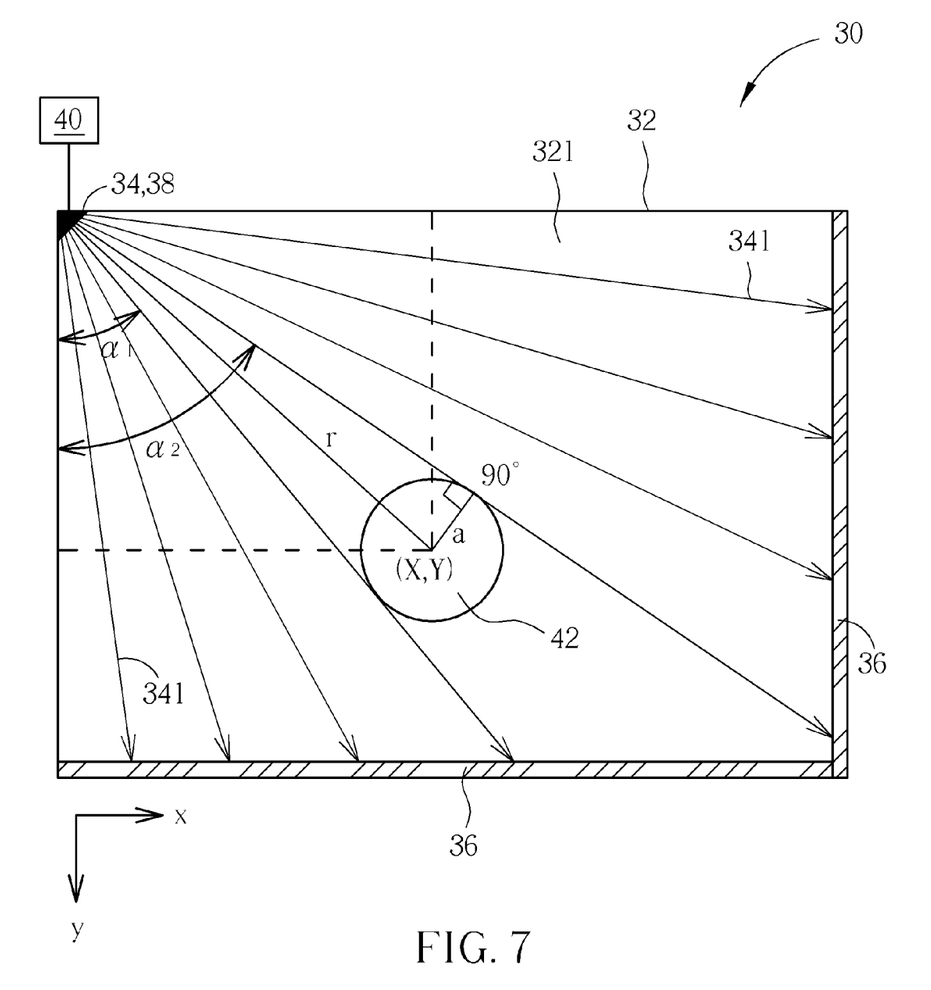
FIG. 7 illustrates the calibrating procedure of the touch input method of the present invention.

Moreover, in the above embodiment, the touch input device 42 has a known radius a, and thus the coordinates of the touch input position can be calculated by the touch input calculating procedure. When the radius of the touch input device 42 is unknown, for example when touch input is carried out by a finger, a calibrating procedure may be performed before actually implementing touch input to calculate the radius a of the touch input device (finger) 42. Once the radius a of the touch input device 42 is known, the coordinates of the touch input position cay be calculated by the touch input calculating procedure. Please refer to FIG. 7. FIG. 7 illustrates the calibrating procedure of the touch input method of the present invention. As shown in FIG. 7, as the radius of the touch input device is unknown, a calibrating procedure is required to calculate the radius a of the touch input device 42. The calibrating procedure includes the following steps. First of all, dispose the touch input device 42 on a calibrating position of the surface 321 of the substrate 32, wherein the calibrating position and the single photo sensor array 38 have a distance r. The calibrating position is a default position of the surface 321 of the substrate 32. In the embodiment which the optical touch panel is integrated into the display panel, the calibrating position can be shown by the display panel, guiding the user to accurately place the touch input device 42 on the calibrating position. Then, the calibrating calculation steps is implemented by the signal processing unit 40, calculating the first boundary azimuth α1 and the second boundary azimuth α2 of the calibrating position based on the reflected light distribution information generated by the single photo sensor array 38. The first boundary azimuth angle α1 and the second boundary azimuth angle α2 correspond respectively to the angles of two initial points that the intensity of the reflected light of the reflected light distribution information begin to decrease and respectively represent two outside end points of the perimeter of the touch input device 42. Finally, the radius a of the touch input device 42 can be calculated by the following equation 4.

$$a = r \sin\left(\frac{\alpha 2 - \alpha 1}{2}\right) \quad \text{equation 4}$$

By executing the above calibrating procedure, the radius a of the touch input device 42 can be obtained. In such a case, the user can implement touch input with the touch input device 42, and the coordinates of the touch input position can be calculated by the touch input calculating procedure. To increase the accuracy of the calibrating procedure, the calibrating procedure can be performed repeatedly. Alternatively, several different calibrating positions can be selected, and the average radius calculated by all the calibrating procedures can be used as the radius a of the touch input device 42.

In summary, the optical touch panel and the touch display device in the present invention can provide the touch input function by only disposing a single planar light generator and a single photo sensor array. As a result, the product cost of the optical touch panel and the complexity of the manufacturing process can be reduced. Furthermore, no matter what the touch input device the consumers use, as long as the radius of the touch input device is calculated through the accurate calculation of the calibrating procedure of the present invention, the touch input device can be used to implement touch input.

Those skilled in the art will readily observe that numerous modifications and alterations of the device and method may be made while retaining the teachings of the invention.

What is claimed is:

1. An optical touch panel, comprising:
a substrate, having a surface;
a single planar light generator, disposed outside the surface of the substrate for generating a planar light; wherein an illuminating range of the planar light covers a range of the surface of the substrate;
at least a retro reflector device, disposed on at least a side of the substrate for reflecting the planar light;
a single photo sensor array, disposed outside the surface of the substrate for sensing the reflected planar light and generating a reflected light distribution information; and
a signal processing unit for performing a touch input calculating procedure to calculate a coordinate of a touch input position of a touch input device based on the reflected light distribution information generated by the single photo sensor array, wherein the touch input calculating procedure includes:
providing a radius (a) of the touch input device;
determining a central azimuth angle (θ), a first boundary azimuth angle (θ1), and a second boundary azimuth angle (θ2) of the touch input position based on the reflected light distribution information;
calculating a distance (R) between the single photo sensor array and the touch input position by an equation 1:

$$R = \frac{a}{\sin\left(\frac{\theta 2 - \theta 1}{2}\right)};$$

and
calculating the coordinate of the touch input position by an equation 2: X=R sin θ and an equation 3: Y=R cos θ, wherein X is a horizontal coordinate of the touch input position and Y is a vertical coordinate of the touch input position.

2. The optical touch panel according to claim 1, wherein the planar light generator is disposed on a corner of the substrate.

3. The optical touch panel according to claim 1, wherein the planar light generator includes an infrared light generator or a laser light generator.

4. The optical touch panel according to claim 1, wherein the photo sensor array includes a complementary metal-oxide-semiconductor (CMOS) photo sensor array or a charge-coupled device (CCD) photo sensor array.

5. A touch display device, comprising:
a display panel; and
an optical touch panel disposed on the display panel, the optical touch panel comprising:
a substrate, having a surface;
a single planar light generator, disposed outside the surface of the substrate for generating a planar light; wherein an illuminating range of the planar light covers a range of the surface of the substrate;
at least a retro reflector device, disposed on at least a side of the substrate for reflecting the planar light;
a single photo sensor array, disposed outside the surface of the substrate for sensing the reflected planar light and generating a reflected light distribution information; and
a signal processing unit for performing a touch input calculating procedure to calculate a coordinate of a touch input position of a touch input device based on the reflected light distribution information generated by the single photo sensor array, wherein the touch input calculating procedure includes:
providing a radius (a) of the touch input device;
determining a central azimuth angle (θ), a first boundary azimuth angle (θ1), and a second boundary azimuth angle (θ2) of the touch input position based on the reflected light distribution information;
calculating a distance (R) between the single photo sensor array and the touch input position by an equation 1:

$$R = \frac{a}{\sin\left(\frac{\theta 2 - \theta 1}{2}\right)};$$

and
calculating the coordinate of the touch input position by an equation 2:
X=R sin θ and an equation 3 :Y=R cos θ, wherein X is a horizontal coordinate of the touch input position and Y is a vertical coordinate of the touch input position.

6. The touch display device according to claim 5, wherein the substrate is a substrate of the display panel and the surface of the substrate is a display side of the display panel.

7. The touch display device according to claim 5, wherein the planar light generator is disposed on a corner of the substrate.

8. The touch display device according to claim 5, wherein the planar light generator includes an infrared light generator or a laser light generator.

9. The touch display device according to claim 5, wherein the photo sensor array includes a complementary metal-oxide-semiconductor (CMOS) photo sensor array or a charge-coupled device (CCD) photo sensor array.

10. A touch input method, including:
providing an optical touch panel, the optical touch panel comprising:
a substrate, having a surface;
a single planar light generator, disposed outside the surface of the substrate for generating a planar light;
wherein an illuminating range of the planar light covers a range of the surface of the substrate;
at least a retro reflector device, disposed on at least a side of the substrate for reflecting the planar light; and
a single photo sensor array, disposed outside the surface of the substrate for sensing the reflected planar light and generating a reflected light distribution information;
implementing touch input on the surface of the substrate with a touch input device, wherein as touch input is processing, a part of the planar light is hindered from reflecting to the single photo sensor array by the touch input device; and
performing a touch input calculating procedure with a signal processing unit for calculating a coordinate of a touch input position based on the reflected light distribution information generated by the single photo sensor array,
wherein the touch input calculating procedure includes:
providing a radius (a) of the touch input device;
determining a central azimuth angle (θ), a first boundary azimuth angle (θ1), and a second boundary azimuth angle (θ2) of the touch input position based on the reflected light distribution information;
calculating a distance (R) between the single photo sensor array and the touch input position by an equation 1:

$$R = \frac{a}{\sin\left(\frac{\theta 2 - \theta 1}{2}\right)};$$

and
calculating the coordinate of the touch input position by an equation 2: X=R sin θ and an equation 3:Y=R cos θ, wherein X is a horizontal coordinate of the touch input position and Y is a vertical coordinate of the touch input position.

11. The touch input method according to claim 10, further comprising a calibrating procedure processing before the touch input calculating procedure to calculate the radius (a) of the touch input device.

12. The touch input method according to claim 11, wherein the calibrating procedure includes:
disposing the touch input device on a calibrating position of the surface of the substrate, wherein the calibrating position and the single photo sensor array have a distance (r);
performing a calibration calculation step with the signal processing unit to calculate a first boundary azimuth angle (α1) and a second boundary azimuth angle (α2) of the calibrating position based on the reflected light distribution information of the single photo sensor array; and
calculating the radius (a) of the touch input device by an equation 4:

$$\alpha = r\sin\left(\frac{\alpha 2 - \alpha 1}{2}\right).$$

* * * * *